US005749986A

United States Patent [19]
Wyatt

[11] Patent Number: 5,749,986
[45] Date of Patent: May 12, 1998

[54] CONTROL OF BATCHING AND CURING PROCESSES

[75] Inventor: W. Tison Wyatt, Candler, N.C.

[73] Assignee: Tracy A. Wyatt, Arden, N.C.; a part interest

[21] Appl. No.: 509,975

[22] Filed: Aug. 1, 1995

Related U.S. Application Data

[63] Continuation-in-part of Ser. No. 189,790, Feb. 1, 1994, abandoned.

[51] Int. Cl.$^6$ .............. B32B 31/00; G01N 27/26; G01R 27/00

[52] U.S. Cl. .......... 156/64; 156/272.4; 156/274.4; 156/352; 156/359; 324/72.5; 324/439; 324/444; 324/450; 324/693; 324/713; 324/717; 364/477.01; 364/477.06

[58] Field of Search ................... 324/433, 439, 324/444, 450, 713, 715, 717, 72, 72.5, 693; 156/64, 272.2, 272.4, 274.4, 274.8, 275.7, 352, 359; 219/765, 773, 778, 779; 364/476, 477

[56] References Cited

U.S. PATENT DOCUMENTS

| | | |
|---|---|---|
| 3,600,247 | 8/1971 | Armstrong ..................... 156/64 |
| 3,963,979 | 6/1976 | Dauphinee ................. 324/433 X |
| 4,161,264 | 7/1979 | Malmgren et al. ............. 222/135 |
| 4,399,100 | 8/1983 | Zsolnay et al. ............ 364/500 X |
| 4,421,589 | 12/1983 | Amini et al. ................. 156/378 |
| 4,423,371 | 12/1983 | Senturia et al. ............... 324/663 |
| 4,453,125 | 6/1984 | Kimura et al. ................ 324/632 |
| 4,614,555 | 9/1986 | Smith et al. .................... 156/64 |
| 4,636,732 | 1/1987 | Willis ........................ 324/450 X |
| 4,747,898 | 5/1988 | Woltron ..................... 156/307.7 |
| 4,773,021 | 9/1988 | Harris et al. .................. 364/476 |
| 4,797,169 | 1/1989 | Aizawa et al. ................... 156/64 |
| 4,802,953 | 2/1989 | Hoeksema et al. ......... 324/717 X |
| 4,818,313 | 4/1989 | Sundberg ........................ 156/64 |
| 4,838,999 | 6/1989 | Haar et al. ................... 205/781.5 |
| 4,971,639 | 11/1990 | Quinn et al. ................... 156/378 |
| 5,002,644 | 3/1991 | Bellows ...................... 205/778.5 |
| 5,043,032 | 8/1991 | Hunter et al. ................... 156/64 |
| 5,095,514 | 3/1992 | Curtis .............................. 385/12 |
| 5,170,124 | 12/1992 | Blair et al. .................... 324/434 |
| 5,219,498 | 6/1993 | Keller et al. ................ 156/64 X |

FOREIGN PATENT DOCUMENTS

0 576 097  3/1946  United Kingdom ............ 156/274.4

Primary Examiner—David A. Simmons
Assistant Examiner—Paul M. Rivard
Attorney, Agent, or Firm—Carter & Schnedler, P.A.

[57] ABSTRACT

Methods and apparatus for detecting and utilizing a voltage produced by a variety of materials for process control and analysis purposes.

30 Claims, 6 Drawing Sheets

CONTROL OF BATCHING AND CURING PROCESSES

CROSS-REFERENCE TO RELATED APPLICATION

This is a continuation-in-part of application Ser. No. 08/189,790, filed Feb. 1, 1994, now abandoned.

DESCRIPTION

1. Technical Field

The invention relates generally to process control and, more particularly, to methods and apparatus for recognizing a change in state of a material. The invention is applicable to a wide variety of industrial processes, including batch mixing processes and curing processes. The invention additionally can be used for evaluating consistency between batches.

2. Background Art

A wide variety of industrial processes require the evaluation of substances which change in at least one characteristic over time. Examples of changes include changes as one substance is added to another for mixing purposes to produce a combined substance; substances which undergo a curing process such as phenolic resins, epoxy resins, and concrete; and substances which change over time as a result of microbiological processes, such as fermentation to produce beer or wine.

It is also desirable in many cases to evaluate a sample of material to determine its conformity to or consistency with a predetermined standard product. Similarly, characteristics of a sample of an unknown material can be compared with corresponding characteristics of a set of known materials to determine the best match for identifying the unknown material.

In typical processes, appropriate parameters are monitored, with varying degrees of ultimate accuracy. Typical parameters include temperature, quantities of material, and time.

For example, in a typical process for manufacturing plastic laminate, multiple stacks of phenolic resin-impregnated sheets of paper-like material are heated in a curing press at least until the phenolic resin cures, and are then cooled. Each stack thus ultimately forms a single sheet of finished plastic laminate material. A typical sheet size is 4 feet by 8 feet (1.2 meters×2.4 meters). The press applies a pressure of approximately 400 psi (28 bar). A typical curing temperature, which varies depending upon the particular formulation, is within the approximate range of 270° F. to 300° F. (132° C. to 149° C.). Conventionally, superheated hot water at approximately 400° F. (204° C.) is employed to heat the press, although any suitable source of heat may be employed.

For efficient press utilization, it is common to assemble a pile including multiple stacks of resin-impregnated sheets, for example fourteen stacks, each including five or six sheets of phenolic resin-impregnated paper-like material. The stacks actually are placed back-to-back in double stacks separated by release paper. More particularly, the pile includes alternating double stacks of resin-impregnated sheets and metal separator sheets, such as stainless steel sheets. The entire pile, including the multiple stacks, is heated between the press plates to produce a finished sheet for each stack.

For efficient press utilization, it is also desirable to minimize the length of time required for each curing cycle, thus maximizing the production rate, over time, of each press. However, if a press heating cycle is terminated prematurely, then the phenolic resin is not properly cured, resulting in defective product. Accordingly, it is conventional to make a press heating cycle longer than the minimum required in order to ensure the phenolic resin is completely cured. Thus it is considered better to sacrifice some production efficiency in order to minimize the risk of producing a bad batch of plastic laminate product due to an incomplete cure. Nevertheless, if the heating cycle is made unnecessarily long, production efficiency adversely suffers.

In order to determine when curing is completed, for typical prior art press operation disposable thermocouples are employed, for example "J"-type thermocouples, inserted into one or more of the stacks among the resin-impregnated sheets. The thermocouple is connected through appropriate signal conditioning and interface circuitry to a controller, which is thus able to sense the temperature of the resin-impregnated sheets during the curing cycle.

In typical prior art operation of a press, superheated hot water at approximately 400° F. (204° C.) circulating through heat exchangers is employed to heat the press plates until temperature of the material, as sensed by the thermocouple, reaches 260° F. (127° C.). Heating then continues for a predetermined interval based on time, for example, eight minutes, during which interval temperature continues to rise at a rate of approximately 3° F. (1.6667° C.) per minute. At the end of the eight-minute additional interval, the material is assumed to be cured, there being an adequate margin to ensure the phenolic resin is completely cured. Total heating time is typically approximately twenty eight minutes. The heat is then turned off, and the press and stacks are then cooled down, which takes approximately thirty five to forty minutes. Cool-down is forced by pumping cooler water through the press and the heat exchangers.

There are two disadvantages in particular of this prior art technique for operating a plastic laminate curing press. One disadvantage is that, when the phenolic resin cures, the thermocouple is permanently embedded in the resultant plastic laminate product, and accordingly cannot be reused. Thus, the process consumes thermocouples.

Another disadvantage, perhaps more significant, is that press production efficiency is not as high as possible due to the intentional prolonging of the heating cycle beyond the minimum required in order to ensure the phenolic resin is completely cured. In part, this results from the indirect manner in which curing of the phenolic resin is sensed; it is simply assumed that, once a particular temperature is reached, curing is assuredly complete.

The invention disclosed herein has broad applicability and, in particular, is applicable to a variety of processes where a material changes state or undergoes a chemical reaction.

DISCLOSURE OF INVENTION

Briefly, and in overview, the invention is based both on the discovery that many substances and the combining of many substances can produce small but measurable voltages, which typically change as a function of time as characteristics of the material change; as well as on a recognition that this passively measured voltage can be related in a practical manner to various process control and analysis implementations.

Significantly, the non-reactive electrodes employed are of the same material, distinguishing the invention from an ordinary battery or power cell.

It is well known that many chemical reactions, including polymerization, as well as simple fundamental changes in state, such as one substance dissolving in another, involve the transfer of electrical charges, produced for example as a result of reaction kinetics. However, these generated electrical charges are on a molecular level, and are generally expected to not be capable of being externally measurable because of charge cancellation.

With many substances, the typical voltages produced are quite small, in the millivolt range, but nevertheless are present, for reasons not fully understood, and can be advantageously employed for a variety of sensing purposes. With two electrodes made of the same material, current general practice has not expected any voltage production, because localized charges on the molecular level would be expected to average out and therefore cancel to zero over the electrode areas, which are on a macro scale.

Typical electrode materials can include stainless steel, silver, copper, aluminum, carbon, iron, gold, platinum and tungsten.

The polarity of the voltage produced is unpredictable. Thus, in some cases one electrode is positive with reference to the other electrode, and in other cases the one electrode is negative with reference to the other electrode. In some cases, the voltage crosses zero, going from negative to positive, or vice versa.

Further, the voltage produced is related to the size of the electrodes, increasing as the electrode area increases.

With certain curing operations, such as the curing of phenolic resins, a variety of polymerization and possibly other chemical reactions are taking place, which can result in fairly complex curves when voltage is plotted as a function of time. With a given type of substance being cured over successive production runs, such as phenolic resin, typically a family of curves is developed, some of which cross zero several times during the course of a cure, and some which do not. In most cases, it is possible to recognize within the first few minutes which of the family of curves is being produced, and thereby reach a conclusion regarding how to determine the end point of the process.

While the reasons for families of curves are not fully understood, one theory is that the different polymerization and other reactions taking place are individually producing voltages which randomly either add or subtract, as sensed by the electrodes, and the final voltage curve sensed by the electrodes results from a combining of the voltages produced by the individual reactions taking place.

The invention may be employed for controlling a batch mixing process wherein a first substance, such as water, is placed in a mixing container and a second substance, such as sugar, is added for combining with the first substance to produce a combined substance, in this example sugar dissolved in water. In overview, the method includes the steps of placing a pair of electrodes in contact with the combined substance, and monitoring voltage between electrodes produced by the combined substance while the second substance is being added. The monitored voltage changes as the second substance is being added and indicates the quantity or concentration. When the monitored voltage causes a predetermined threshold voltage, it is recognized that a sufficient quantity of the second substance has been added.

In some cases, a curve fitting approach is preferred, where voltage is monitored as a function of time while the second substance is being added, and the function is evaluated, such as by a mathematical curve fitting technique, and compared to a plurality of predetermined functions to determine the best match.

The mixing action may interfere with or mask the measured voltage with "noise" voltage, particularly where mechanical mixing is employed. Also, the electrode area in contact with the combined substance may vary. Thus large variations in measured voltage may occur that are unrelated to constituent concentration. In such cases, it is preferred to periodically withdraw a quantity of the combined substance into a monitoring vessel where mechanical disturbances are minimized, and employing a pair of electrodes to monitor voltage produced by the combined substance within the monitoring vessel.

The invention may also be employed to recognize consistency between batches of material, such as mixed food products, including gelatin. Thus, a pair of electrodes is placed in contact with the substance, and voltage between the electrodes produced by the substance as a function of time is monitored. The monitored voltage as a function of time is compared to at least one predetermined function to determine a degree of conformity. A typical voltage function may be a relatively steady voltage being produced over time. Variations in this voltage over time could be indicative of a variation in ingredients, or even bacterial contamination.

Similarly, the invention may be employed as an analytic technique to identify an unknown substance by comparison with known samples. Thus, a pair of electrodes is placed in contact with a substance to be analyzed, and voltage between electrodes produced by the substance as a function of time is monitored. The monitored voltage as a function of time is compared to a set of predetermined functions to determine a best match. Again, mathematical curve fitting techniques may be applied.

The invention may also be employed to control various curing processes, including various polymerization reactions, detecting when concrete has cured, and detecting when the precursors of alcoholic beverages such as beer and wine have completed fermentation. Thus, a method for monitoring change in a substance which changes in at least one characteristic over time includes the steps of placing a pair of electrodes in contact with the substance, and monitoring voltage between electrodes produced by the substance as a function of time. In some cases, simple thresholding is appropriate. Thus, it is recognized that a sufficient change has occurred when the monitored voltage crosses a predetermined threshold. In other cases, particularly where a complex voltage as a function of time function is developed, such as may be represented by a curve where voltage is plotted as a function of time, curve fitting may be employed to compare the monitored voltage as a function of time to a plurality of predetermined functions to determine the best match.

The invention also contemplates an instrument for monitoring substances which change in at least one characteristic over time. The instrument includes a pair of electrodes made of the same material for placing in contact with a substance, a voltage measuring circuit connected to electrodes for monitoring voltage between electrodes produced by the substance, and a recorder for recording voltage as a function of time. The recorder may comprise, for example, a simple strip chart recorder, or a memory, such as a computer memory. Preferably, the instrument further includes a curve-fitting device for recognizing a characteristic voltage as a function of time function.

In accordance with a more particular aspect of the invention, there is provided a method for controlling a plastic laminate curing press having a pair of press plates between which at least one stack of phenolic resin-impregnated sheets is heated. The method includes the steps of employing a pair of metallic elements on either side of the stack as electrodes. Preferably, these metallic elements employed as electrodes are metal separator sheets employed between stacks of resin-impregnated sheets in a pile including alternating stacks of resin-impregnated sheets and metal separator sheets. In accordance with the invention, voltage between electrodes is monitored while the stack is being heated, and heating of the stack is terminated when the monitored voltage decreases below a predetermined threshold voltage, that is, when the monitored threshold voltage decreases to near zero. Preferably, in order to avoid premature termination of the press heating cycle as sensed voltage fluctuates around zero at the beginning of the press heating cycle, a predetermined delay interval must elapse before heating of the stack can be terminated.

In accordance with another more particular aspect of the invention, there is provided a controller for controlling a plastic laminate curing press having a pair of press plates between which at least one stack of phenolic resin-impregnated sheets is heated. The controller includes a heat control element for controlling heating of the stack, a sensing circuit connected to electrodes on either side of the stack for monitoring voltage between electrodes, and a control device connected to the heat control element and to the sensing circuit and operable to initiate heating of the stack and operable to subsequently terminate heating of the stack when the voltage between the press plates decreases below a predetermined threshold voltage. Preferably, the control device is operable to subsequently terminate heating of the stack when the voltage between the press plates decreases below the predetermined threshold voltage after a predetermined delay interval has elapsed.

More generally, the invention provides a method for recognizing a change in state of a material, such as the curing of a resin from liquid to solid form, for example, a phenolic resin or an epoxy resin. Thus, the terminology "change in state" is employed herein in a broad sense to include, but without limitation, polymerization reactions. The method includes the steps of placing a pair of electrodes in contact with the material, monitoring voltage between the electrodes while the change in state is expected to occur, and recognizing the change in state when the monitored voltage decreases below a predetermined threshold voltage.

In some cases, what is herein termed a "change in state" is accompanied by an increase in voltage. In other cases, a peak or a dip in the voltage signal monitored over time indicates that a particular change in state has occurred, for example the onset or completion of a constituent boiling out of a complex material, such as alcohol boiling from phenolic resin. Thus, in accordance with the invention, a voltage signal is developed, and the rate of change of the voltage signal is determined. The change in state is recognized when the rate of change reaches zero.

The invention thus provides methods and apparatus for control of a plastic laminate curing press for increased production efficiency. The invention eliminates the need for thermocouples inserted within the stacks of resin-impregnated sheets during the manufacture of plastic laminate. The invention further provides methods and apparatus for more directly sensing when a change in state of a material has occurred, such as the change in state of a resin, such as a phenolic resin or an epoxy resin, from liquid to solid form.

BRIEF DESCRIPTION OF DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

BEST MODES FOR CARRYING OUT THE INVENTION

Figure 1:
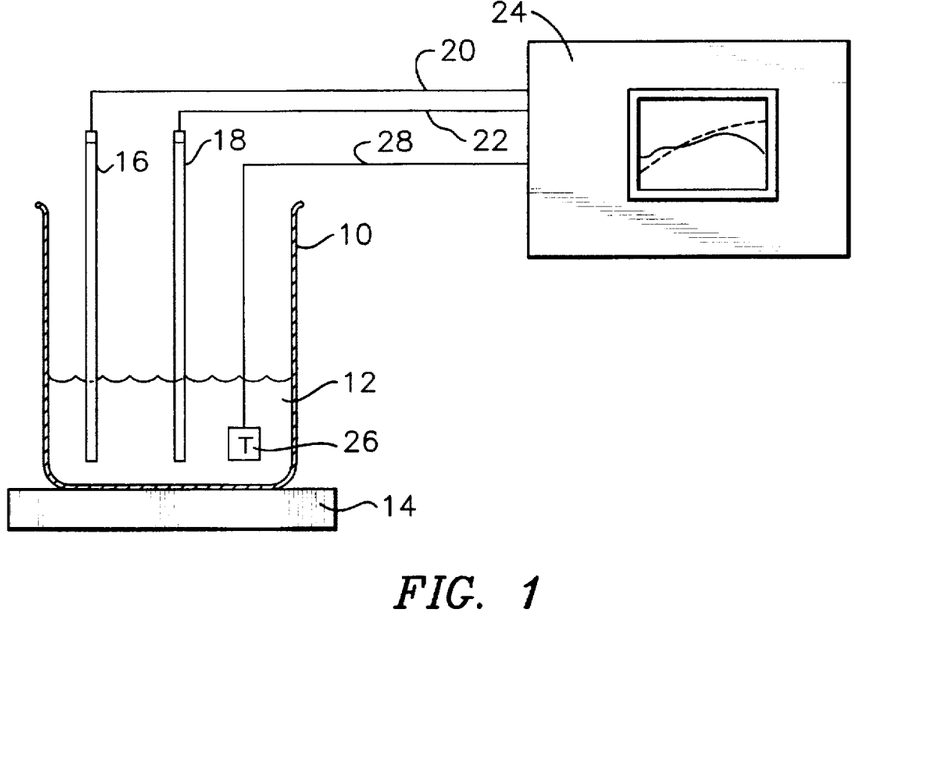
FIG. 1 depicts generalized apparatus for recognizing a change in state of a material.
Figure 2:
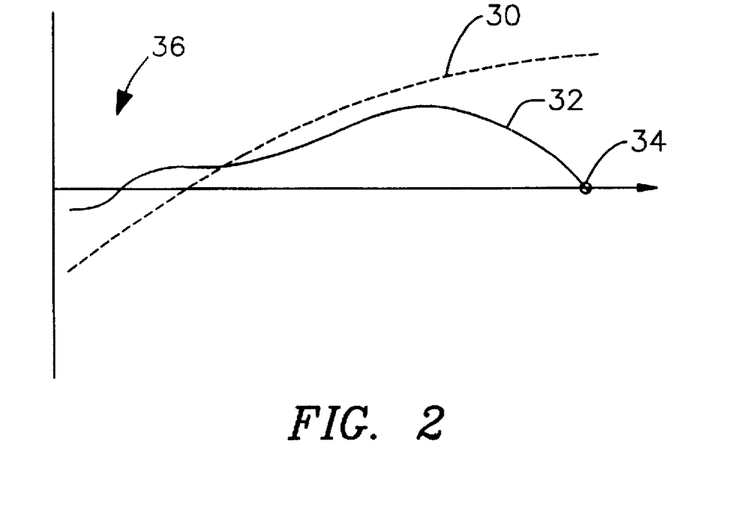
FIG. 2 is a graph plotting temperature and voltage as a function of time during a typical phenolic resin curing cycle as recorded during operation of the apparatus of FIG. 1.

Referring first to FIGS. 1 and 2, in FIG. 1 a beaker 10 contains a quantity of test material 12, such as phenolic resin, and is heated over a hot plate 14. In contact with the material 12 are a pair of electrodes 16 and 18, such as stainless steel electrodes, connected via respective leads 20 and 22 to a strip chart recorder 24. In addition, a temperature sensing device 26, such as a thermocouple, is connected via a test lead 28 to the strip chart recorder 24. The particular strip chart recorder 24 employed has at least two channels, and is arranged to plot voltage and temperature as a function of time.

FIG. 2 is a plot or graph depicting a typical strip chart recording produced as the material 12 is heated. In FIG. 2, temperature is plotted as a dash line 30, while voltage between the electrodes 16 and 18 is plotted as a solid line 32.

As a phenomenon not fully understood, a measurable voltage, as represented by the plot line 32, is produced between the electrodes 16 and 18 as the phenolic resin 12 is heated and cures. This voltage eventually decreases to essentially zero when the resin 12 is completely cured, as indicated at a point 34 in the plot of FIG. 2.

While it is a DC voltage which is produced, the polarity is unpredictable. Thus, during successive test runs, either the electrode 16 or the electrode 18 is positive with reference to the other of the electrodes 16 and 18. Moreover, at the beginning of a run, as indicated generally at 36, the voltage may undergo fluctuations, including a polarity reversal, before settling out with one relative polarity or the other.

It may be noted that the two electrodes 16 and 18 are of the same material, such as stainless steel. The magnitude of the voltage depends to some extent on the area of the electrodes, and can range from a maximum of five or ten millivolts in the case of small electrodes placed in a test beaker 10, to more than ten volts in the case of electrodes of many square feet (several square meters) in a plastic laminate press embodiment. Thus, the phenomenon is something other than a simple battery effect.

Further, rather than the single curve of FIG. 2, which may be recognized as having a characteristic shape representative of a particular voltage as a function of time function, which can be determined employing a mathematical curve fitting technique and mathematically described, various other curve shapes may be produced during different production tests run. For example, a given general type of substance may be produce six different curves during successive experimental runs, which are referred to herein as a family of curves for the particular substance. In the case of phenolic resin, it has experimentally been determined that at least one of the family of curves is produced during approximately one-half of the test runs, and the remaining curves occur less frequently. In any event, it is generally possible to determine within the first few minutes which of the family of curves is being produced, and thereby to appropriately determine input determination criteria. For example, a curve may cross zero several times prior to a zero crossing which indicates curing is complete.

Figure 3:
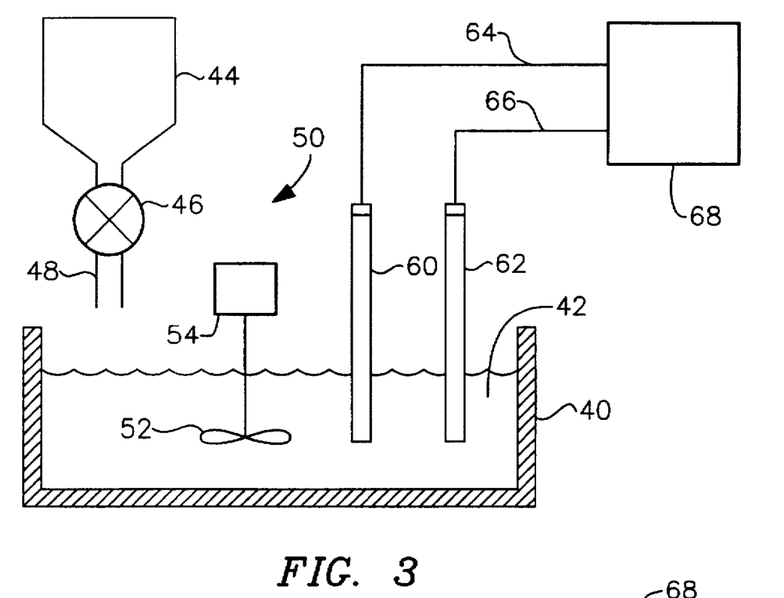
FIG. 3 depicts generalized apparatus for monitoring a batch mixing process.

FIG. 3 represents in generalized form a batch mixing process. Thus, in FIG. 3 a mixing container 40 includes a quantity of a first substance 42, which gradually becomes a combined substance 42 as a second material is added. Thus, a supply hopper 44 contains a quantity of the second substance, which discharges through a mixing valve 46 and a conduit 48 into the combined substance 42. Shown in highly schematic form is a paddle mixer 50, including a mixing blade 52 driven by a motor 54.

In accordance with the invention, a pair of electrodes 60 and 62 are placed in contact with the combined substance 42, and connected via electrical conductors 64 and 66 to an instrumentation device 68 such as a microvoltmeter, a strip chart recorder, or a computer-based data acquisition and analysis system. The electrodes 60 and 62 are made of the same material, such as stainless steel or carbon. As the second material from the hopper 42 is added, voltage produced by the combined substance 42 as monitored across the electrodes 60 and 62 varies, as an indicator of relative concentration.

In view of the extremely small signal levels involved, typically in the millivolt range, changes in the area of the electrodes 60 and 62 in contact with the combined substance 42, and other mechanical changes, can cause undesirable voltage fluctuations which adversely affect the ability to determine concentration.

Figure 4:
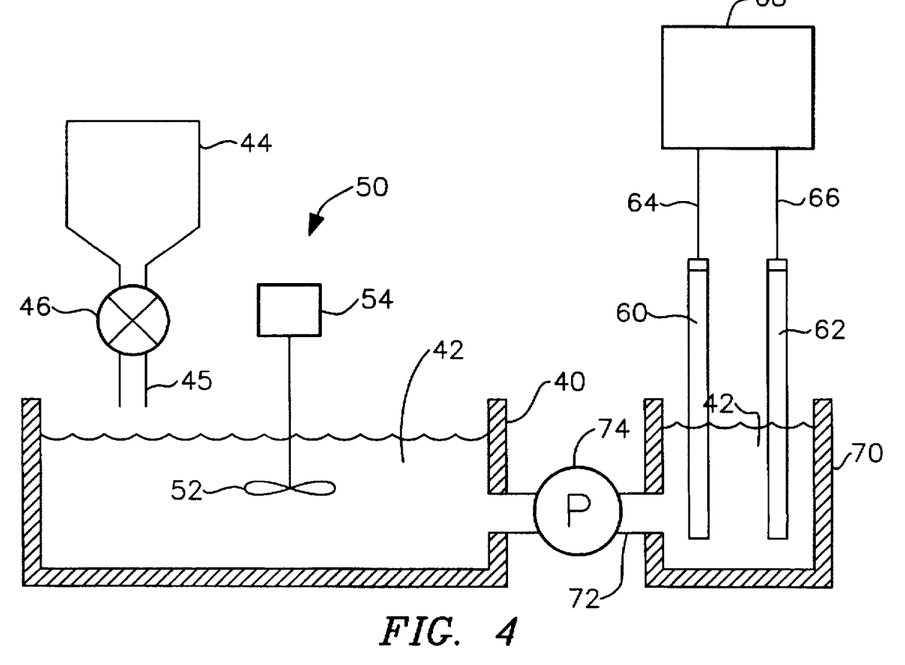
FIG. 4 depicts generalized apparatus including a separate monitoring vessel for monitoring a batch mixing process.

Thus, FIG. 4 depicts an alternative arrangement where there is a separate monitoring vessel 70 connected to the mixing vessel 40 via a conduit 72, and a representative pump 74 or other device for periodically withdrawing a quantity of the combined substance 42 from within the mixing vessel 40 to the monitoring vessel 70, for making undisturbed readings.

Figure 5:
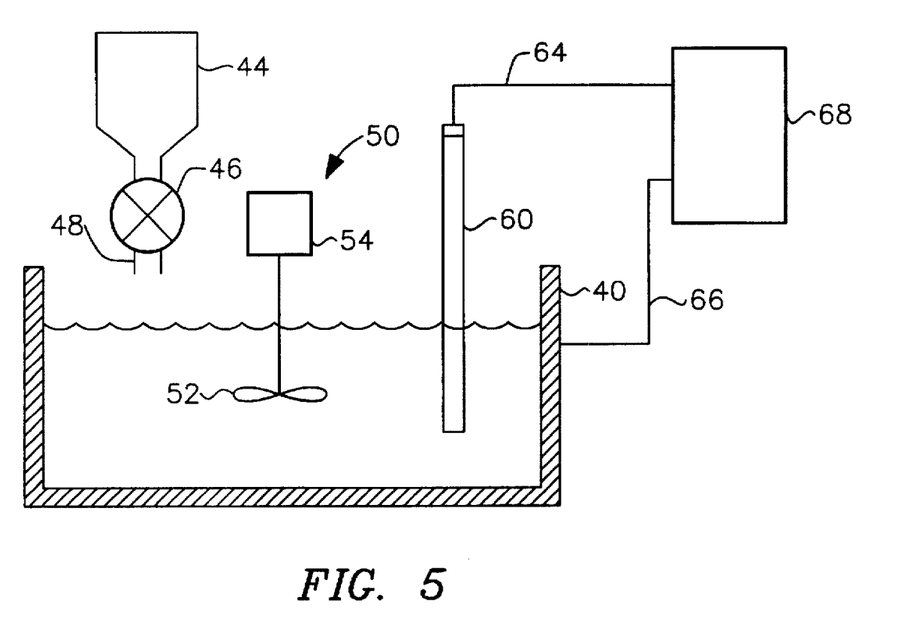
FIG. 5 depicts generalized apparatus wherein the walls of a mixing or monitoring vessel serve as one of the two electrodes.

FIG. 5 illustrates a variation wherein the monitoring vessel 40 has conductive walls, which serve as one of the electrodes. In this case, the electrode 60 is made of the same material as the monitoring vessel wall. The same technique may be implied to the separate monitoring vessel 70 of FIG. 4.

EXAMPLE NO. 1

A 100 ml glass beaker was filled with 50 ml of common Acetic Acid (vinegar). The liquid was at a room temperature of approximately 25° C. (77° F.). Two approximately 3.2 mm diameter 304 stainless steel probes were placed into the beaker without touching the sides of the beaker and had a gap between them of about 35 cm.

The stainless steel probes were connected to a strip chart recorder by solid copper wires to measure voltage. A 10,000 ohm resister also was put across these terminals to give a "load" to the circuit.

Measured amounts (¼ teaspoon) of baking soda were periodically added to the beaker until the production of carbon dioxide ceased.

Initially, prior to the addition of baking soda, measured voltage was in excess of 0.5 millivolts. When baking soda was added, the measured voltage immediately dropped to approximately 0.04 millivolts, and then increased over a five minute interval to 0.2 millivolts. Additional baking soda was added, and measured voltage dropped over a five minute interval to 0.16 millivolts, then over a three minute interval increased to 0.18 millivolts. As additional amounts of baking soda were added, each time, the measured voltage decreased and then partly rebounded over a period of time, with an overall downward-sloping voltage curve. The slope decreased with each addition of baking soda. The slope when voltage is plotted as a function of time appears to be meaningful.

The resultant voltage as a function of time plot on the strip chart recorder reflects the formation reaction for the production of carbon dioxide.

EXAMPLE NO. 2

A liter of distilled water was heated to a near boil and sucrose was added, stirred vigorously, until the solution was completely saturated. A 100 ml glass beaker was then filled with 50 ml of this hot solution of distilled water and sucrose. Two 304 stainless steel rods were placed into the beaker without touching the sides of the beaker and had a gap between them of about 35 cm. The beaker was then placed in an ice bath to cool the solution down to about 2° C.

The stainless steel probes were connected to a strip chart recorder by solid copper wires to measure voltage. A 10,000 ohm resister also was put across these terminals to give a "load" to the circuit.

As the solution cooled, crystals dropped out of solution. During crystallization, a voltage of approximately 0.3 millivolts was produced and measured, and approached zero when finished.

The resultant voltage as a function of time plot on the strip chart recorder reflects the formation rate of crystal production.

EXAMPLE NO. 3

A liter of distilled water was heated to a near boil and sodium chloride was added, stirred vigorously, until the solution was completely saturated. A 100 ml glass beaker was then filled with 50 ml of this hot solution of distilled water and sodium chloride. Two 304 stainless steel rods were placed into the beaker without touching the sides of the beaker and had a gap between them of about 35 cm. The beaker was then placed in an ice bath to cool the solution down to about 2° C.

The stainless steel probes were connected to a strip chart recorder by solid copper wires to measure voltage. A 10,000 ohm resister also was put across these terminals to give a "load" to the circuit.

As the solution cooled, crystals dropped out of solution. The produced voltage went to 0.02 millivolts when at equilibrium.

The resultant voltage as a function of time plot on the strip chart recorder reflects the formation rate of crystal production.

EXAMPLE NO. 4

A liter of distilled water was heated to a near boil and magnesium sulfate was added, stirred vigorously, until the solution was completely saturated. A 100 ml glass beaker was then filled with 50 ml of this hot solution of distilled water and magnesium sulfate. Two 304 stainless steel rods were placed into the beaker without touching the sides of the beaker and had a gap between them of about 35 cm. The beaker was then placed in an ice bath to cool the solution down to about 2° C.

The stainless steel probes were connected to a strip chart recorder by solid copper wires to measure voltage. A 10,000 ohm resister also was put across these terminals to give a "load" to the circuit.

As the solution cooled, crystals dropped out of solution. The produced voltage crossed zero several times, and settled near zero volts after about thirty minutes.

The resultant voltage as a function of time plot on the strip chart recorder reflects the formation rate of crystal production.

EXAMPLE NO. 5

A 100 ml glass beaker was filled with 20 ml of household ammonia/water (which had been distilled). The liquid was at a room temperature of approximately 25° C. (77° F.). Two 304 stainless steel rods were placed into the beaker without touching the sides of the beaker and had a gap between them of about 35 cm.

The stainless steel probes were connected to a strip chart recorder by solid copper wires to measure voltage. A 10,000 ohm resister also was put across these terminals to give a "load" to the circuit.

Measured amounts (5 ml) of 3% w/w iodine solution were added to the beaker until production of precipitate ceased.

Initial measured voltage was in excess of 0.5 millivolts. Each time iodine solution was added, the voltage dropped and then partially rebounded, over a period of several minutes. The voltage crossed zero after one addition of iodine. The slope decreased with each addition of iodine solution.

The resultant voltage as a function of time plot on the strip chart recorder reflects the equilibrium formation rate of crystal precipitate production via consumption of the iodine component.

EXAMPLE NO. 6

A 100 ml glass beaker was filled with 20 ml of w/w iodine solution. The liquid was at a room temperature of approximately 25° C. (77° F.). Two 304 stainless steel rods were placed into the beaker without touching the sides of the beaker and had a gap between them of about 35 cm.

The stainless steel probes were connected to a strip chart recorder by solid copper wires to measure voltage. A 10,000 ohm resister also was put across these terminals to give a "load" to the circuit.

Measured amounts (5 ml) of 3% ammonia/water solution were added to the beaker until production of precipitate ceased.

Measured voltage was very similar to Example 5 above.

The resultant voltage as a function of time plot on the strip chart recorder reflects the equilibrium formation rate of crystal precipitate production via consumption of the ammonia component.

EXAMPLE NO. 7

A 250 ml plastic cup was filled with 50 ml of quick forming cement powder. While stirring the powder, 20 ml of 25° C. distilled water was added to the cup until the power/water system was mixed; about 15 seconds. Two 304 stainless steel rods were placed into the cup without touching the sides of the cup and had a gap between them of about 35 cm.

The stainless steel probes were connected to a strip chart recorder by solid copper wires to measure voltage. A 10,000 ohm resister also was put across these terminals to give a "load" to the circuit.

The measured voltage was initially −13.0 millivolts. The measured voltage crossed zero after about one hour, and reached +3.0 volts approximately two hours from the starting time, and stabilized at +3.0 volts for an extended period of time.

EXAMPLE NO. 8

As an example of making beer, wort was prepared and placed in a fermentation pot. A pair of stainless steel probes were placed in contact with the wort and connected to a strip chart recorder for recording voltage readings during fermentation. The initial voltage was 6.0 millivolts, and decreased to 0.6 millivolts after six hours. The voltage slowly decreased over a period of days, and after four days was 0.2 millivolts. The voltage held at 0.2 millivolts for one day. Fermentation (as indicated by bubbles) ceased after nine days, and the voltage crossed zero to −0.02 millivolts.

EXAMPLE NO. 9

As an example of adding ingredients in a cooking process, ⅛ cup water was placed in a glass cooking container. A pair of stainless steel probes were placed in contact with the material in the container, and connected to a strip chart recorder for recording voltage measurements. The following ingredients were sequentially added while heating: ¼ cup corn syrup, ½ cup distilled water, ¼ teaspoon baking soda, and ½ teaspoon salt. As each ingredient was added, the voltage changed. A polarity reversal occurred when corn syrup was added.

EXAMPLE NO. 10

Several brands of food gelatin were compared. Gelatin was prepared in accordance with recipe directions, combining mix and distilled water in a boiling solution. The solutions were cooled until solidified. Stainless steel electrodes were used to measure voltage produced by the gelatin. With one brand, a voltage remained relatively constant over time. With another brand, the voltage produced varied significantly over a period of time, crossing zero sometimes.

EXAMPLE NO. 11

50 ml 4% polyvinyl alcohol by mass was mixed with 10 ml of a 4% by weight sodium borate solution to produce a polymer solution, polyvinyl alcohol sodium borate polymer complex.

A voltage of 0.8 millivolts was produced, which slowly dropped to near zero.

EXAMPLE NO. 12

Ordinary grocery bags were cut into eight ten-inch square (25.4 cm by 25.4 cm) pieces of paper, which were soaked in phenolic resin. A squeegee was employed to remove excess phenolic resin. The eight pieces were stacked and then sandwiched between two eleven-inch by twelve-inch (27.9 cm by 30.5 cm) stainless steel sheets, with a J-type thermocouple placed midway in the stack. One input of a strip chart recorder was connected to the thermocouple to record temperature, and another input of the strip chart recorder was connected to the two stainless steel sheets to measure voltage across the stainless steel sheets. The paper sandwich, initially at a temperature of 50° F. (10° C.), was placed horizontally in an oven heated to 300° F. (149° C.), and a twenty-pound (nine kilogram) weight placed on top of the sandwich.

Heating of the sandwich commenced, with an initial recorded temperature of 50° F. (10° C.) and an initial recorded voltage of 1 millivolt. There was an initial voltage peak of 8 millivolts at 10 minutes, with a recorded temperature of 90° F. (32° C.). Voltage decreased to approximately 2.5 millivolts at 25 minutes, with a recorded temperature of 130° F. (54° C.). Voltage remained at approximately 2.5 millivolts for a further 10 minutes, beginning to rise at 35 minutes, with a recorded temperature of 150° F. (66° C.), believed to coincide with the onset of alcohol boiling from the phenolic resin. There was a second voltage peak of 11 millivolts at 57 minutes, with a recorded temperature of 190° F. (88° C.), believed to coincide with the substantial completion of alcohol boiling from the phenolic resin. Voltage decreased, reaching essentially 0 millivolts at 160 minutes, with a recorded temperature of 275° F. (135° C.), at which time the phenolic resin was cured.

Very small voltages are produced in some cases, particularly when one of the substances producing a voltage being monitored is normally considered an insulator, such as oils, alcohols or waxes, or other organic hydrocarbons.

Figure 6:
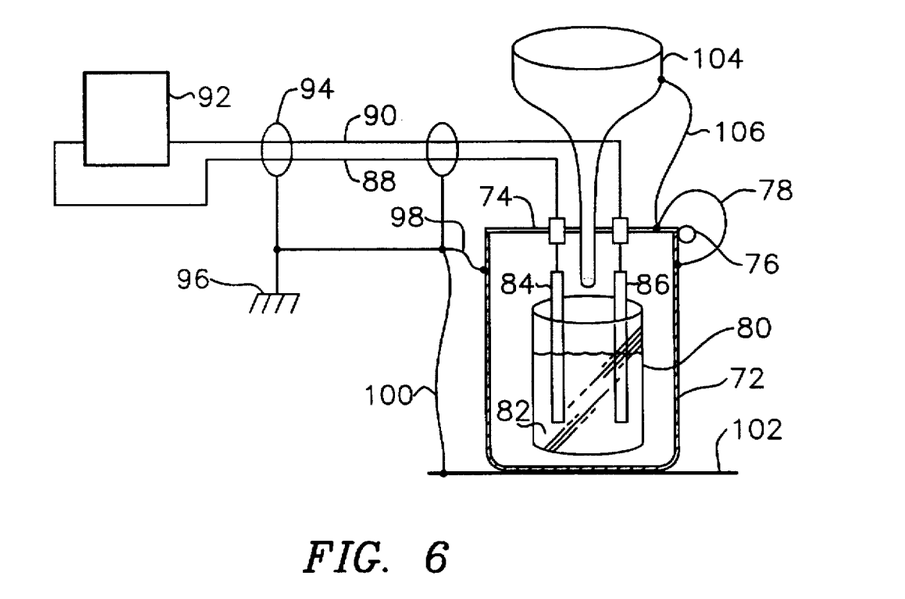
FIG. 6 depicts a shielded test vessel for measuring small voltages.

FIG. 6 is a conceptual diagram of a shielded test vessel 70 for monitoring small voltages. Thus, the device 70 of FIG. 6 includes a shielded container 72, for example made of steel, having a conductive lid 74 hinged at 76, with a ground strap 78 provided to ensure good electrical continuity between the container 72 and the lid 74.

There is an inner test container 80 containing a liquid substance 82 producing a voltage which is monitored. A pair of carbon electrodes 84 and 86 are provided, connected via shielded leads 88 and 90 to a microvolt measuring or recording device 92, which may be a computer-based data acquisition system. The conductors 88 and 90 are part of a shielded cable assembly, with a cable shield 94 connected to ground 96 and, via straps 98 and 100, to the outer shield container 72 and a support structure 102.

For introducing materials into the test container 80, a stainless steel funnel 104 is provided, which passes through a suitable aperture in the lid 94, and is connected to the lid 94 via a ground strap 106.

Figure 7:
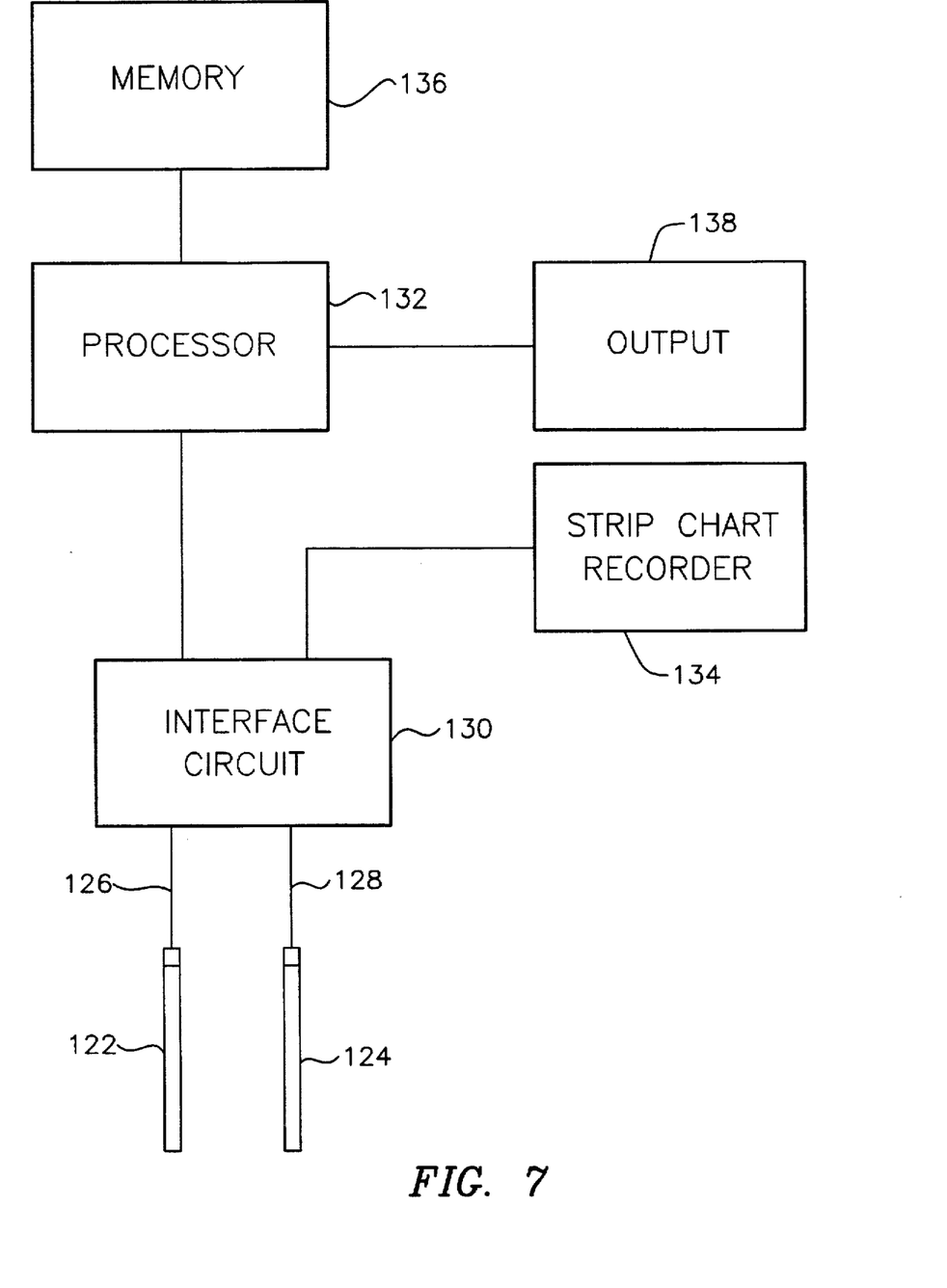
FIG. 7 depicts a generalized instrument.

Referring now to FIG. 7, shown in highly diagrammatic form is an instrument, generally designated 120, for monitoring substances which change in at least one characteristic over time. The instrument 120 includes a pair of electrodes 122 and 124 which are made of the same material, such as stainless steel, for placing in contact with a substance. The electrodes 122 and 124 are connected via conductors 126 and 128 to a voltage measuring circuit for measuring voltage between the electrodes 122 and 124 produced by the substance. In FIG. 7 the voltage measuring circuit comprises an analog interface circuit 130, which includes an analog-to-digital converter, connected to a computer processor 132 as part of a conventional data acquisition system. There is a recorder for recording voltage as a function of time, which recorder can take the form of a strip chart recorder 134 connected to the interface circuit 130, or a memory 136 supplied with data by the processor 132 in accordance with voltage data from the interface circuit 130. A suitable output device 138 such as a printer or a display screen is connected to the processor 138.

Appropriate programming may also be included within the memory 136, such as curve-fitting routines for recognizing a characteristic voltage as a function of time.

Figure 8:
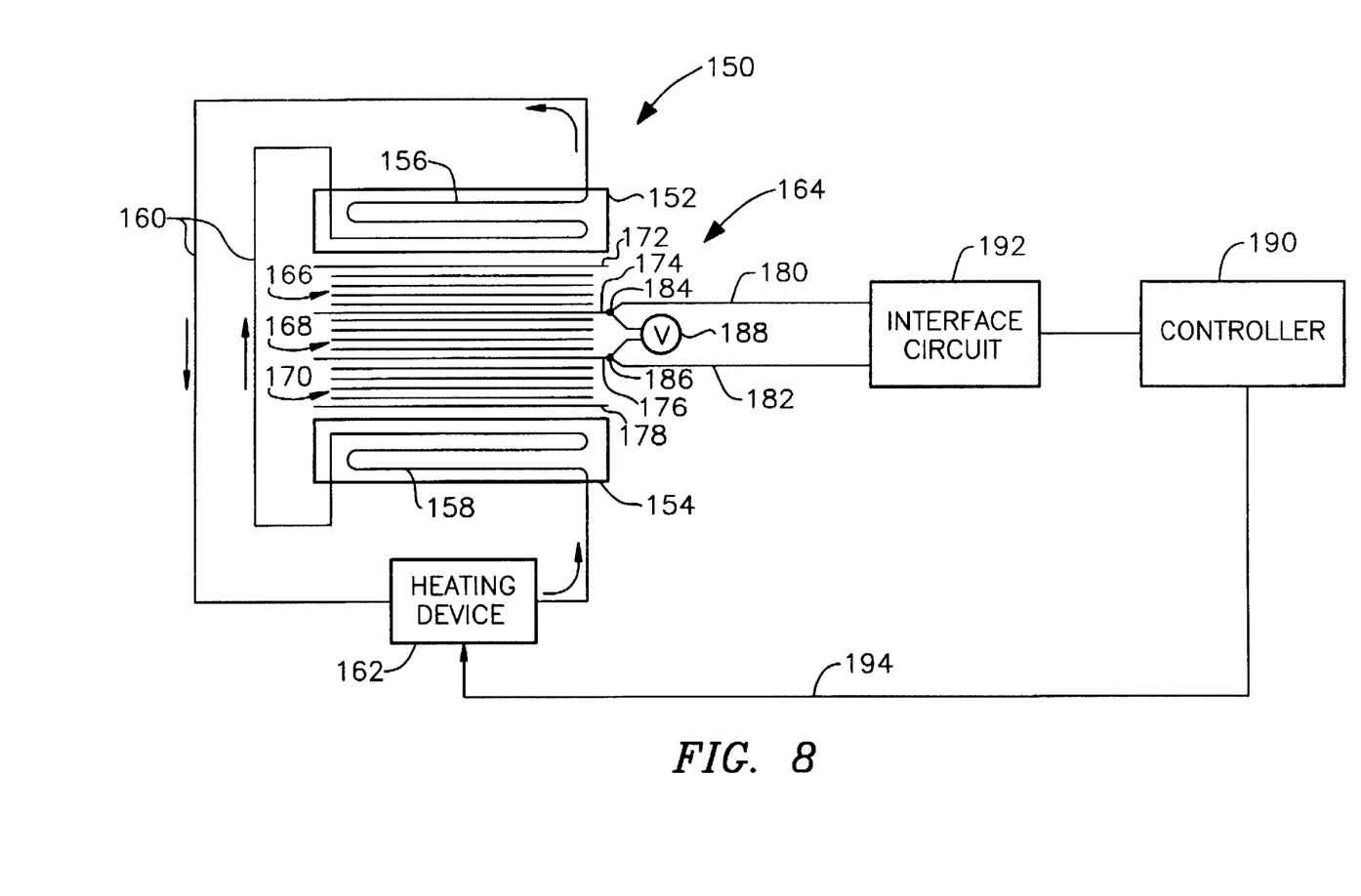
FIG. 8 is a highly schematic representation of a plastic laminate curing press and a controller in accordance with the invention.

Referring now to FIG. 8, in a practical embodiment of the invention a conventional plastic laminate curing press, generally designated 150, includes an upper press plate 152 and a lower press plate 154 which in turn include respective heat exchangers 156 and 158 and which are controllably heated by superheated hot water circulating through a fluid flow loop 160 heated by a controllable heating device 162. The heating device 162 is conventional, and includes a pump for circulating hot water through the loop 160. In addition, although not indicated in the drawing figure, the heating device 162 is also capable of circulating cooling water for cooling down the press 150 near the end of a curing cycle.

In accordance with conventional practice, a pile 164 of alternating double stacks 166, 168 and 170 of resin-impregnated sheets and metal separator sheets 172, 174, 176 and 178 is placed within the press 150, compressed between the press plates 152 and 154 with a pressure in the order of 4000 psi, and heated. Each of the double stacks 166, 168 and 170 conventionally comprises two individual stacks (not separately shown) of five or six resin-impregnated sheets each placed back-to-back and separated by release paper. On the front of each individual stack is a pattern sheet (not shown) placed directly against one of the metal separator sheets 172, 174, 176 and 178 to produce a glossy finish. The heating cycle commences and proceeds as is described generally above under the heading "Background of the Invention". It will be appreciated that, for purposes of illustration, the elements of the pile 164 are spaced and that, during actual press operation, the elements are all in contact.

Each of the illustrated double stacks 166, 168 and 170 results in the production of two sheets of plastic laminate, which are typically four feet by eight feet (1.2 meters×2.4 meters) in size. Although a total of three double stacks 166, 168 and 170 are illustrated, this particular number is for purposes of illustration only, as each pile 164 placed into the press 150 typically comprises seven double stacks, resulting in fourteen sheets of plastic laminate product being produced. An actual plastic laminate production press has from eighteen to thirty vertically-arranged openings (not shown), and each opening receives one pile of double stacks. Thus, a typical plastic laminate production press with twenty-two openings produces three-hundred eight finished plastic laminate sheets per batch.

As discussed hereinabove, in the prior art approach, control is based on temperature as sensed by a thermocouple (not shown) placed among the individual sheets of one or more of the stacks 166, 168 and 170. In accordance with the invention, rather than employing a thermocouple, two or more of the separator sheets 172, 174, 176 and 178 are employed as electrodes, such as the separator sheets 174 and 176. In FIG. 3, sensing leads 180 and 182 are connected to the separator sheets 174 and 176 at respective connection points 184 and 186, across which a voltage is developed, as represented by the voltmeter 188 connected to these points 184 and 186. The voltmeter 188 is included in FIG. 3 for purposes of illustration only, and would normally not be included in actual apparatus implementing the invention.

For controlling press operation, a controller 190 is provided, which may comprise an Allen-Bradley P.L.C., such as a Model 2/30, with an analog input card depicted in FIG. 3 as an interface circuit 192. The interface circuit 192 serves the function of applying suitable signal conditioning to voltage signals conducted along the leads 180 and 182, and converting the voltage to digital form for further processing in the controller 190. The interface circuit 192 is set up for high impedance voltage sensing, although a 10K Ohm load resistor (not shown) may be connected across the input leads 180 and 182 for noise reduction purposes. A two-second integration time is typically employed for filtering purposes.

The controller 190 is microprocessor-based, and is programmed in a conventional manner. It will be appreciated that the controller 190 is appropriately and conventionally interfaced to generally control operation of the press 150, such as opening and closing of the press 150, as well as control of the heating device 162, via a representative control line 194.

Figure 9:
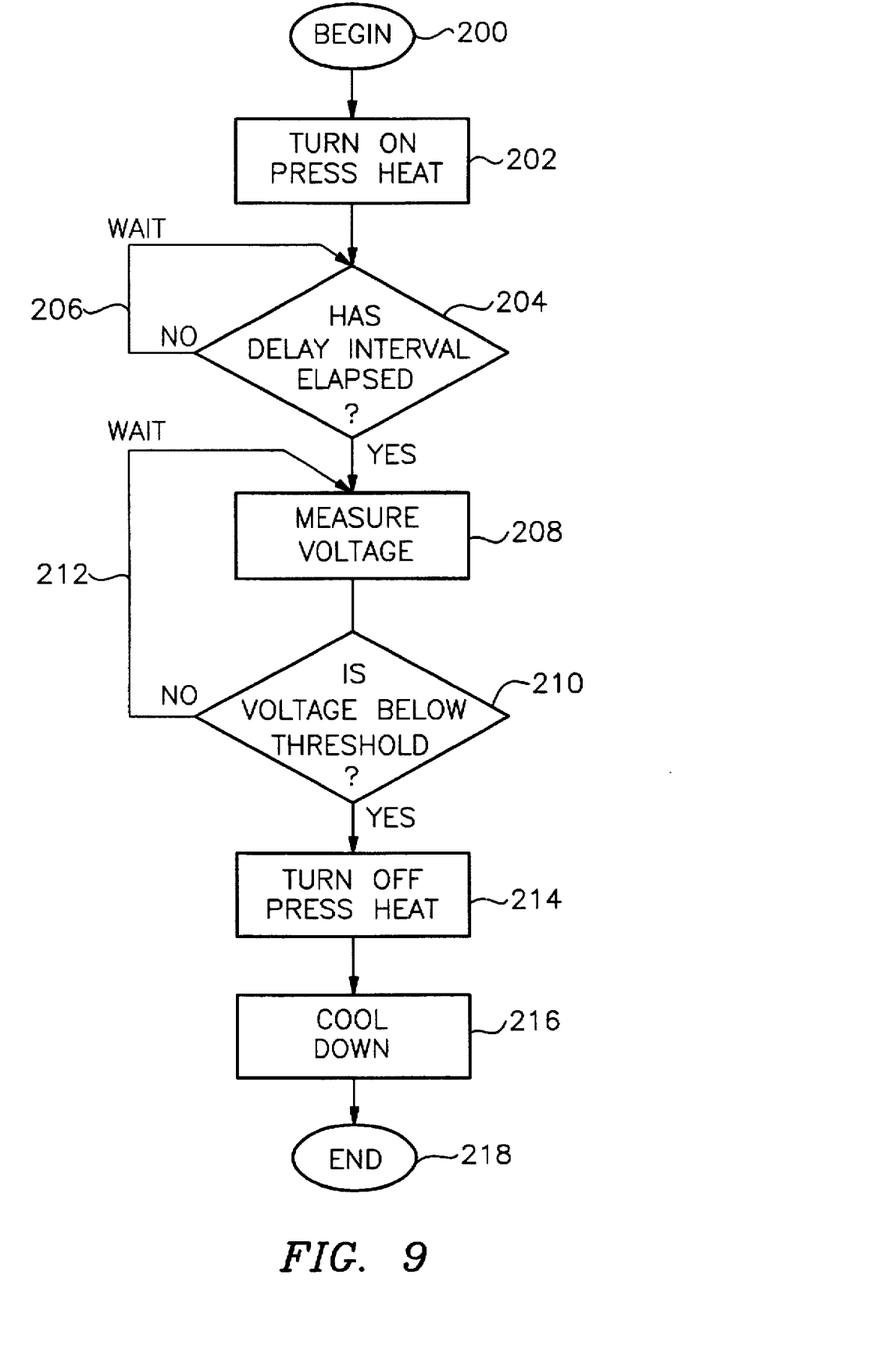
FIG. 9 is a simplified flowchart of a control program implemented in the controller of FIG. 3.

Operation of the FIG. 8 controller 190 is represented in the program flowchart of FIG. 9. Briefly, the FIG. 9 control program is entered in box 200. In box 202, press operation is commenced by, among other things, turning on the press heat by activating the heating device 162. In order to allow time for adequate voltage to be developed as the chemical reactions associated with curing proceed, and additionally to avoid ambiguity caused by initial polarity reversals as indicated in FIG. 2, decision box 204 implements a predetermined delay interval, such as twenty minutes, before the controller 190 even begins to consider whether to terminate the heating operation. Thus, even though an increase in production efficiency is desired, it is assumed that under no circumstances could curing be completed in less than twenty minutes. Thus, in decision box 204, the question is continually asked whether the delay interval has elapsed. So long as the answer is "no", then execution flow path 206 is taken, implementing a wait loop.

When the answer in decision box 204 is eventually "yes", indicating the exemplary twenty-minute delay interval has elapsed, then, in box 208, the voltage across the electrodes comprising the separator plates 174 and 176 is measured via the interface circuit 192. In decision box 210, this voltage is compared to a threshold voltage selected to determine when the measured voltage is near zero. So long as appreciable voltage between the electrodes comprising the separator plates 174 and 176 is sensed, the answer in decision box 210 is "no", and program execution loops back along execution flow path 212 back to box 208 where the voltage is again measured.

When curing of the phenolic resin is completed, the answer is decision box 210 is then "yes", and box 214 is entered to initiate press cool down by turning off press heat and, typically, instituting active cool down in a conventional manner as indicated in box 216. When cool down is completed, which takes approximately thirty five to forty minutes, the press is opened, and execution terminates at 218.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

INDUSTRIAL APPLICABILITY

The way in which the invention is capable of being exploited and the way in which it can be made and used will be apparent from the foregoing. The invention thus provides methods and apparatus for control of a plastic laminate curing press for increased production efficiency and without requiring thermocouples inserted within the stacks of resin-impregnated sheets.

I claim:

1. A method for controlling a batching process wherein a first substance is placed in a mixing container and a second substance is added for combining with the first substance to produce a combined substance, said method comprising:

employing a pair of electrodes placed in contact with the combined substance, the electrodes being not electrochemically dissimilar;

monitoring voltage between the electrodes produced by the combined substance while the second substance is being added, without applying any external voltage; and recognizing that a sufficient quantity of the second substance has been added when the monitored voltage crosses a predetermined threshold voltage.

2. A method in accordance with claim 1, which comprises terminating the addition of the second substance when the monitored voltage crosses the predetermined threshold voltage.

3. A method in accordance with claim 1, which comprises employing a pair of electrodes made of the same material.

4. A method in accordance with claim 1, wherein one of the electrodes comprises a container wall.

5. A method in accordance with claim 1, which comprises periodically withdrawing a quantity of the combined substance into a monitoring vessel, and employing the pair of electrodes to monitor voltage produced by the combined substance within the monitoring vessel.

6. A method for controlling a batching process wherein a first substance is placed in a mixing container and a second substance is added for combining with the first substance to produce a combined substance, said method comprising:

employing a pair of electrodes placed in contact with the combined substance, the electrodes being not electrochemically dissimilar;

monitoring voltage between the electrodes produced by the combined substance as a function of time while the second substance is being added, without applying any external voltage; and evaluating the monitored voltage as a function of time to determine the proportional amount of the second substance added to the first substance.

7. A method in accordance with claim 6, wherein the step of evaluating the monitored voltage comprises comparing the monitored voltage as a function of time to a plurality of predetermined functions to determine the best match.

8. A method in accordance with claim 6, which comprises employing a pair of electrodes made of the same material.

9. A method in accordance with claim 6, wherein one of the electrodes comprises a container wall.

10. A method in accordance with claim 6, which comprises periodically withdrawing a quantity of the combined substance into a monitoring vessel, and employing the pair of electrodes to monitor voltage produced by the combined substance within the monitoring vessel.

11. A method for evaluating conformity of a substance to a predetermined standard, said method comprising:

placing a pair of electrodes in contact with the substance, the electrodes being not electrochemically dissimilar;

monitoring voltage between the electrodes produced by the substance as a function of time, without applying any external voltage; and comparing the monitored voltage as a function of time to at least one predetermined function to determine a degree of conformity.

12. A method in accordance with claim 11, which comprises the preliminary step of determining the predetermined function by placing a pair of electrodes in contact with a control sample of the substance and monitoring voltage between the electrodes produced by the control substance as a function of time.

13. A method in accordance with claim 11, which comprises employing a pair of electrodes made of the same material.

14. A method for analyzing a substance, said method comprising:

placing a pair of electrodes in contact with the substance, the electrodes being not electrochemically dissimilar;

monitoring voltage between the electrodes produced by the substance as a function of time, without applying any external voltage; and comparing the monitored voltage as a function of time to a set of predetermined functions to determine a best match.

15. A method in accordance with claim 14, which comprises employing a pair of electrodes made of the same material.

16. A method for monitoring change in a substance which changes in at least one characteristic over time, said method comprising:

placing a pair of electrodes in contact with the substance, the electrodes being not electrochemically dissimilar;

monitoring voltage between the electrodes produced by the substance as a function of time, without applying any external voltage; and employing the monitored voltage to control a process.

17. A method in accordance with claim 16, which further comprises recognizing that a sufficient change has occurred when the monitored voltage crosses a predetermined threshold.

18. A method in accordance with claim 16, which further comprises comparing the monitored voltage as a function of time to a plurality of predetermined functions to determine the best match.

19. A method in accordance with claim 16, which comprises employing a pair of electrodes made of the same material.

20. A method for controlling a plastic laminate curing press having a pair of press plates between which a stack of phenolic resin-impregnated sheets is heated, said method comprising:

employing a pair of metallic elements on either side of the stack as electrodes, the electrodes being not electrochemically dissimilar;

monitoring voltage between the electrodes produced by the phenolic resin-impregnated sheets while the stack is being heated, without applying any external voltage; and terminating heating of the stack when the monitored voltage decreases below a predetermined threshold voltage.

21. A method in accordance with claim 20, wherein said step of terminating heating comprises terminating heating of the stack when the monitored voltage decreases below the predetermined threshold voltage after a predetermined delay interval has elapsed.

22. A method in accordance with claim 20, wherein the step of employing a pair of metallic elements as electrodes comprises assembling a pile including alternating stacks of resin-impregnated sheets and metal separator sheets, and employing two of the separate sheets as electrodes.

23. A controller for controlling a plastic laminate curing press having a pair of press plates between which a stack of phenolic resin-impregnated sheets is heated, said controller including:

a heat control element for controlling heating of the stack;

a sensing circuit connected to electrodes on either side of the stack for monitoring voltage between the electrodes produced by the phenolic resin-impregnated sheets, without applying any external voltage, the electrodes being not electrochemically dissimilar; and a control device connected to said heat control element and to said sensing circuit and operable to initiate heating of the stack and to subsequently terminate heating of the stack when the voltage between the press plates decreases below a predetermined threshold voltage.

24. A controller in accordance with claim 23, wherein said control device is operable to subsequently terminate heating of the stack when the voltage between the press plates decreases below the predetermined threshold voltage after a predetermined delay interval has elapsed.

25. A method for recognizing a change in state of a material, said method comprising:

placing a pair of electrodes in contact with the material, the electrodes being not electrochemically dissimilar;

monitoring voltage between the electrodes produced by the material while the change in state is expected to occur, without applying any external voltage; and recognizing the change in state when the monitored voltage crosses a predetermined threshold voltage.

26. A method in accordance with claim 25, which comprises recognizing the change in state when the monitored voltage decreases below a predetermined threshold voltage.

27. A method in accordance with claim 25, wherein the material is a phenolic resin and the change in state is curing from liquid to solid form.

28. A method in accordance with claim 26, wherein the material is a resin, and the change in state is curing from liquid to solid form.

29. A method in accordance with claim 26, wherein the material is an epoxy resin, and the change in state is curing from liquid to solid form.

30. A method for recognizing a change in state of a material, said method comprising:

placing a pair of electrodes in contact with the material, the electrodes being not electrochemically dissimilar;

measuring voltage between the electrodes produced by the material while the change in state is expected to occur to develop a voltage signal, without applying any external voltage;

determining the rate of change of the voltage signal; and recognizing the change in state when the rate of change reaches zero.

* * * * *